United States Patent Office 3,795,652
Patented Mar. 5, 1974

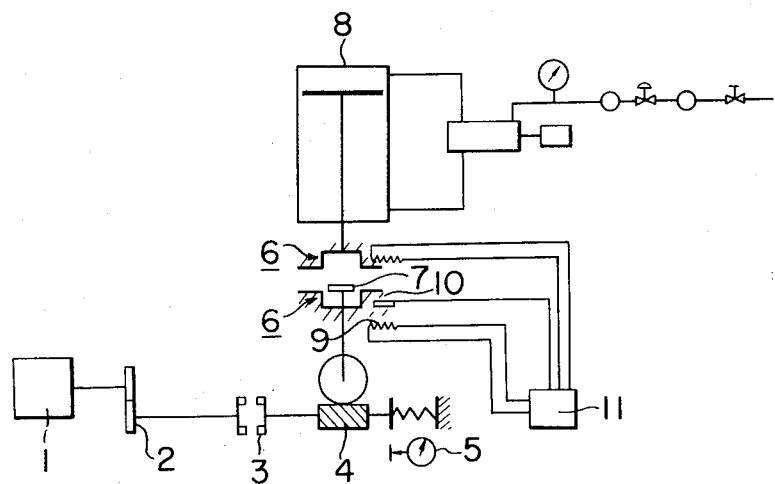

3,795,652
NOVEL RUBBERY COPOLYMER COMPOSITIONS
Koretaka Yamaguchi, Kawasaki, Kazuo Toyomoto, Yokohama, Kuniaki Sakamoto, Tokyo, and Toshio Ibaragi, Kawasaki, Japan
Continuation-in-part of abandoned application Ser. No. 874,640, Nov. 6, 1969. This application July 3, 1972, Ser. No. 268,682
Int. Cl. C08c 11/18, 11/22; C08d 9/08
U.S. Cl. 260—33.6 AQ                 3 Claims

ABSTRACT OF THE DISCLOSURE

Rubber compositions suitable for tire tread with improved processability comprise from 25 to 75 parts by weight of a process oil having a viscosity-specific gravity constant not less than 0.850 and from 40 to 100 parts by weight of carbon black per 100 parts by weight of a rubber component comprising at least 30% by weight of a copolymer mixture having a Mooney viscosity from 40 to 150 and a relaxation time from 20 to 200 sec. as measured by a Mooney viscometer.

This is a continuation-in-part application of United States patent application Ser. No. 874,640, filed Nov. 6, 1969, which has been abandoned.

BACKGROUND OF THE INVENTION (1) Field of the invention

This invention relates to rubber compositions of solution polymerized butadiene-styrene copolymer mixture suitable for tire tread with improved processability.

(2) Description of the prior arts

Heretofore, rubbery butadiene-styrene copolymers prepared by emulsion polymerization have been widely used as the rubber material for tire tread and other industrial products. Recently, as disclosed in British Pat. No. 994,726 butadiene-styrene random copolymer rubber has been developed comprising from 10 to 40 percent by weight of styrene and not more than 12% of 1,2-linkage in butadiene units prepared by using lithium based catalysts. Also, in Rubber and Plastic Age, October issue of 1965, page 1144, there is described development of rubbery butadiene-styrene random copolymers containing 25% by weight of styrene and 28% of 1,2-linkage in butadiene units for use as tire tread. The tires made from these rubber materials possess better physical properties for practical use such as abrasion resistance and heat generation on tire travelling than those of emulsion polymerized rubbery butadiene-styrene copolymers.

However, the butadiene-styrene copolymers prepared by solution polymerization, while being of improved physical properties for practical use, are associated with worse properties for processability. For example, they are far inferior in easiness of mixing with fillers such as carbon black by means of a Banbury mixer, banding to an open roll as well as rate of extrusion through an extruder. It is therefore necessary to use these rubbery copolymers blended with the rubbery butadiene-styrene copolymer prepared by emulsion polymerization which is inferior in physical properties for practical use but is superior in properties for processability. Under these circumstances, the excellent physical properties of the former have not been brought into fully play.

As stated above, there has been developed no rubber composition provided with combined advantages in both physical properties for practical use and processability. In fact, a compromise has been made between processability and physical properties by the use of a mixture of the rubber materials such as a mixture of emulsion polymerized rubbery butadiene-styrene copolymer and polybutadiene or a mixture of emulsion polymerized rubbery butadiene-styrene copolymer, solution polymerized rubbery butadiene-styrene copolymer and emulsion and solution polymerized rubbery polybutadienes.

SUMMARY OF THE INVENTION

It is an object of this invention to provide rubber compositions composed of a rubbery butadiene-styrene random copolymer mixture in which such disadvantages in processability as those in the rubber compositions of the prior butadiene-styrene random copolymers prepared by solution polymerization for tire tread are eliminated and which exhibit improvements in physical properties for practical use in every respect such as in abrasion resistance, slip resistance on a wet road surface and resistance to heat generation on tire travelling. Other objects will appear hereinbelow.

We have found that these objects of this invention can be accomplished by rubber compositions comprising from 25 to 75 parts by weight of a process oil having a viscosity-specific gravity constant not less than 0.850 and from 40 to 100 parts by weight of carbon black per 100 parts by weight of a rubber component comprising at least 30% by weight of a copolymer mixture having a Mooney viscosity of from 40 to 150 and a relaxation time of from 20 to 200 sec. as measured by a Mooney viscometer and 70% or less of at least one member selected from the group consisting of natural rubber, emulsion polymerized rubbery butadiene-styrene copolymer, emulsion polymerized rubber polybutadiene, solution polymerized rubbery low-cis and high-cis polybutadiene, rubbery polybutadiene and rubbery butadiene-styrene copolymer polymerized with an alfin catalyst, rubbery polyisoprene and rubbery butadiene-isoprene copolymer, said copolymer mixture comprising from 10 to 90 parts by weight of a rubbery butadiene-styrene random copolymer containing from 5 to 30% by weight of styrene, at least 60% of 1,4-linkage in butadiene units, having a Mooney viscosity of from 5 to 75 and a relaxation time of from 5 to 100 sec., and from 90 to 10 parts by weight of a rubbery butadiene-styrene random copolymer containing from 5 to 30% by weight of styrene, at least 60% of 1,4-linkage in butadiene units, having a Mooney viscosity of from 85 to 250 and a relaxation time of from 60 to 1000 sec., said butadiene-styrene random copolymers being respectively produced by using a catalyst consisting of lithium or an organolithium compound under the polymerization conditions of from 120° to 180° C. with an average residence time of 1–3 hours, said Mooney viscosity being measured at 100° C. at a rotor rate of 2 r.p.m., said relaxation time being the time following normal measurement of the Mooney viscosity for the Mooney viscometer reading to reach a value of 20% of the Mooney viscosity value immediately before stopping of the rotor of said viscometer.

The Mooney relaxation time measured by a Mooney viscometer as referred to herein is the time for the reading of a Mooney viscometer to become 20% of the Mooney viscosity immediately before stopping of the rotor after measurement of the normal Mooney viscosity (Mooney viscosity at 100° C. at a rotating rate of the rotor of 2 r.p.m.). The relaxation time accordingly represents the stress relaxation character of unvulcanized rubber and will vary depending upon the degrees of cohesive energy and entanglement of the polymer. The greater these degrees the longer is the relaxation time. We have made particularly extensive investigations into the relationship between the relaxation time and physical properties of rubber to find that properties for Banbury processability, especially mixing time of rubber with fillers with Banbury and extrudability are in close relation with the relaxation time and the longer the relaxation the better is the processability. In order to measure the relaxation time by means of a Mooney viscometer, a Mooney viscometer in accordance with ASTM-D-1646 which is provided with a clutch between the driving member and the worm gear in the torque detector is used. The accompanying drawing illustrates a construction of the equipment. In the drawing, there are given a driving member 1, a speed change gear 2, a clutch 3, a worm gear 4, a dial gauge for torque detection 5, a die 6, a rotor 7, an air cylinder 8, a heater 9, a thermometer 10 and a temperature controller 11. The dimensions and other designs are in accord with those in ASTM-D-1646. The gear and the worm gear are designed in such a manner that the rotor is operated at 2 r.p.m. The tested material is placed above and below the rotor, namely within the die, temperature of which is set at 100° C.

Pressure is applied to the air cylinder as high as 1.2 tons and the measurement is made in a usual way, that is, after preheated for 1 min. the rotor is rotated for 4 min., followed by measurement of the Mooney viscosity according to reading of the dial gauge. After 4 minues' rotation the clutch, preferably an electromagnetic clutch, is put off and the time until reading of the gauge becomes 20% of the Mooney viscosity immediately before release of the clutch is recorded as the relaxation time (sec.).

The relaxation time in a prior solution polymerized butadiene-styrene random copolymer rubber is within the range between 1 and 7 sec. It is almost impossible or very inefficient in productivity to apply a solution polymerized rubbery butadiene-styrene copolymer as such to the processing procedures of rubber products for an emulsion polymerized rubbery butadiene-styrene copolymer or natural rubber, and the excellent physical properties thereof have not effectively manifested themselves in application. The relaxation time of the rubbery butadiene-styrene copolymer mixture used in the compositions of this invention should be in the range from 20 to 200 sec. as stated above and when it is less than 20 sec., the copolymer mixture will be unsatisfactory in processability, especially in extrudability and when it is more than 200 sec., the copolymer mixture will be of unsatisfactory physical properties for practical use as tire tread.

Said copolymer mixture which is used in the present invention comprises from 10 to 90 parts by weight of a rubbery butadiene-styrene random copolymer containing from 5 to 30% by weight of styrene, at least 60% of 1,4-linkage in butadiene units, having a Mooney viscosity of from 5 to 75 and a relaxation time of from 5 to 100 sec., and from 90 to 10 parts by weight of a rubbery butadiene-styrene random copolymer containing from 5 to 30% by weight of styrene, at least 60% of 1,4-linkage in butadiene units, having a Mooney viscosity of from 85 to 250 and a relaxation time of from 60 to 1000 sec.

In general, lithium based catalysts are one of few practical catalysts usable for random copolymerization of butadiene and styrene. When polymerization of 1,3-butadiene and styrene in a hydrocarbon solvent is carried out in the presence of a lithium based catalyst, a minor portion of the styrene is combined at random in the resulting rubbery copolymer whereas a major portion thereof is combined as the blocks of styrene at the active ends of the molecules after completion of polymerization of the 1,3-butadiene due to lower rate of polymerization of styrene than that of 1,3-butadiene. Therefore, in order to produce the rubbery random copolymers to be used in the present invention, such a process as disclosed in British Pat. No. 994,726 ca nbe applied, in which a monomer mixture containing a larger amount of styrene is initially prepared and as the polymerization proceeds with a lithium catalyst an additional amount of 1,3-butadiene is continuously or intermittently introduced into the reaction system.

Alternatively, rubbery butadiene-styrene random copolymers can be prepared, as disclosed in British Pat. No. 1,029,445, by using a small amount of an organic alkali metal compound other than the lithium one represented by the general formula

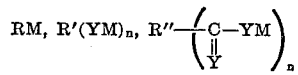

or the like wherein R, R' or R" is a radical selected from saturated aliphatic hydrocarbons, cyclic saturated hydrocarbons and aromatic hydrocarbons, M is an alkali metal other than lithium, Y is oxygen or sulfur and $n$ is an integer from 1 to 3 added to a lithium based catalyst without introduction of additional 1,3-butadiene.

Furthermore, rubbery butadiene-styrene random copolymers can be obtained by the simultaneous use with the lithium based catalyst of an additive with a polar group such as ethers, for example, diethyl ether, tetrahydrofuran, 1,3-dioxane, polyethylene oxide, polypropylene oxide or the like. In the aforementioned preparation, since such additives as cited above tends to increase the content of 1,2-linkage in butadiene units, it is necessary that the addition of additive containing a polar group is controlled in such a way as to produce more than 60% of the 1,4-linkage, namely, less than 40% of the 1,2-linkage.

The processes for producing random copolymers mentioned above also can be applied to the production of rubbery butadiene-styrene random copolymers with a relaxation time from 5 to 100 sec. and a relaxation time from 60 to 1,000 sec. used in this invention. However, the copolymerization at far higher temperatures for much longer periods of residence time than the polymerization conditions for the prior copolymers is usually employed for the purpose. In the prior processes such as that in British Pat. No. 903,331, random copolymers are produced by the addition of butadiene and styrene to a butyllithium hexane solution at a rate slower than the normal rate of polymerization. If the copolymerization is effected at higher temperatures, the rate of polymerization will be faster, the rate of addition of the monomer faster and accordingly the average time of residence shorter. For example, in the process described in the examples of said British patent, polymerization temperature of 120° C. is associated with addition times from 50 to 72 min., accordingly the average time of residence is from 25 to 36 min. The copolymers with the relaxation time in such a range as defined in this invention cannot be obtained under such conditions as mentioned above. In general, these copolymers can be produced by the continuous process rather than the batch process. In the continuous process the copolymerization is carried out effectively at a temperature higher than 140° C. with an average time of residence longer than 60 min. Butadiene-styrene random copolymers with a relaxation time from 5 to 100 sec. and from 60 to 1,000 sec. are usually obtained under the polymerization conditions from 120° C. to 180° C. with a residence time of 60 min. or from 120° C. to 170° C. with the residence time of 120 min. By the process of copolymerization described above are produced rubbery copolymers with much highly branched structures.

In the present invention on preparing butadiene-styrene copolymer mixtures with a relaxation time from 20 to 200 sec. copolymers with various relaxation times, Mooney viscosities and styrene contents may be separately produced and then mixed or one copolymer may be produced and then another copolymer produced in the presence of the former copolymer and mixed therewith. The copolymer mixtures thus prepared provide rubber compositions having more characteristic processability and physical properties than those of single homogeneous copolymers.

Copolymer mixtures which are used in this invention are those composed of from 10 to 90 parts by weight of the copolymers with a Mooney viscosity from 5 to 75 and a relaxtion time from 5 to 100 sec. and from 90 to 10 parts by weight of the copolymers with a Mooney viscosity from 85 to 250 and a relaxation time from 60 to 1,000 sec. The mixtures thus prepared exhibit a rate of extrusion similar to, the degree of die swelling less than and practical resistance to abrasion larger than those of single homogeneous copolymers.

As lithium based catalyst used for carrying out the present invention are mentioned, for example, metallic lithium, methyllithium, ethyllithium, butyllithium, amyllithium, hexyllithium, 2-ethylhexyllithium, phenyllithium, various tolyllithiums, xylyllithiums, α-naphthyllithium, methylenedilithium, ethylenedilithium, trimethylenedilithium, tetramethylenedilithium, pentamethylenedilithium, 1,4-dilithiumbenzene, 1,5-dilithiumnaphthalene and the like.

It is necessary for the rubbery butadiene-styrene random copolymers used in this invention to contain from 5 to 30% by weight of styrene. The copolymers containing less than 5% of the combined styrene have inferior physical properties for practical use, particularly disadvantageous in control stability on a wet road surface. With more than 30% adverse effects are produced in the physical properties, particularly in abrasion resistance and heat generation on tire travelling.

The rubbery butadiene-styrene copolymer mixtures employed in this invention are required to have a Mooney viscosity from 40 to 150. The copolymer mixtures with a Mooney viscosity less than 40 provide adverse physical properties for practical use, and on the other hand, a Mooney viscosity more than 150 leads to worse extrudability and dispersability of fillers such as carbon black during the processing and is disadvantageous for the physical properties for practical use.

The butadiene combined in each rubbery butadiene-styrene random copolymers used in this invention must have at least 60% of 1,4-linkage. When the proportion of the 1,4-linkage is less than 60%, the physical properties for practical use as tire tread, particularly abrasion resistance and heat generation on tire travelling will be adversely affected.

The rubbery butadiene-styrene random copolymer mixture used in this invention either alone or in combination with natural and/or other synthetic rubbers is mixed with a variety of compounding agents, processed and submitted to practical use. In general, the copolymer mixture may be used alone for the rubber material of tire tread but, depending upon the nature and use of the tire, may be used in combination with natural and/or other synthetic rubbers with synergistic effects.

Synthetic rubbers used in combination with a rubbery butadiene-styrene random copolymer mixture applied to the present invention include emulsion polymerized butadiene-styrene copolymer rubber, emulsion polymerized polybutadiene rubber, solution polymerized low-cis or high-cis polybutadiene rubber, polybutadiene rubbers or butadiene-styrene copolymer rubber polymerized with alfin catalysts, polyisoprene rubber, butadiene-isoprene copolymer rubber and the like. Combined use with polybutadiene rubber and/or emulsion polymerized butadiene-styrene copolymer is particularly preferred in view of processability and physical properties for practical use as tire tread.

These natural and/or synthetic rubbers are used either alone or in combination of two or more, and in order to make the most of the characteristic properties of the rubbery butadiene-styrene random copolymer mixture applied to the present invention must be contained in the rubber component used in the tire tread compositions as much as at least 30% by weight.

As the compounding agents with the rubbery butadiene-styrene random copolymer mixture alone or in combination with and/or other synthetic rubbers applied to the rubber compositions of this invention are especialy important the process oil and carbon black in view of physical properties for practical use.

The process oil employed as the rubber compounding agent is composed of high boiling fractions of petroleum. Based upon the chemical structure of hydrocarbon molecules in the oil it is classified in the paraffin series composed of saturated chain hydrocarbons, the naphthene series composed of saturated cyclic hydrocarbons and the aromatic series composed of unsaturated cyclic hydrocarbons. It is usually classified depending upon the viscosity-specific gravity constant (abbreviated as V.G.C.), generally one with V.G.C. from 0.790 to 0.849 being classified in the paraffin series, one with V.G.C. from 0.850 to 0.899 in the naphthene series and one with V.G.C. of 0.900 or higher in the aromatic series. As the process oil used in tire tread of this invention is used a naphthene or aromatic series process oil having V.G.C. of 0.850 or higher and the most preferred one is an aromatic series process oil with V.G.C. of 0.900 or higher. The process oil is added in the present invention in an amount from 25 to 75 parts by weight per 100 parts by weight of the rubber component. Addition of the process oil in an amount less than 25 parts by weight will not result in successful dispersion of the filler and vulcanizing accelerator and more than 75 parts by weight will deteriorate the physical properties of vulcanized rubber.

The process oil used in this invention may be mechanically mixed simultaneously with other compounding agents by means of a Banbury mixer or open roll or it may be used by mixing the entire amount or a portion thereof in solution with the rubbery butadiene-styrene copolymer mixture to be applied to the present invention followed by removal of the solvent to give an oil extended polymer.

The type and amount of the carbon black to be incorporated into rubber as a compounding agent exert a great influence upon the physical properties for the practical use as a tire. The amount of carbon black incorporated in the present invention is determined in consideration of the amount of process oil added and is from 40 to 100 parts by weight per 100 parts by weight of the rubber component. Use of an amount less than 40 parts by weight will be insufficient to give satisfactory dynamic properties for practical use, particularly abrasion resistance.

The nature of carbon black used in this invention may be essentially the same as that used in the emulsion polymerized rubbery butadiene-styrene copolymers or in polybutadiene. Carbon black of HAF grade having a particle size of 40 m$\mu$ or carbon black of ISAF grade having a particle size of approximately 27 m$\mu$ is usually employed. Carbon black having a larger or smaller particle size also may be used depending upon the travelling conditions of the tire. As stated above, the amount and nature of carbon black used should be adequately selected in view of the travelling conditions of the tire.

The carbon black used in this invention may be mechanically mixed on a Banbury mixer or open roll with process oil and other compounding agents or it may be used as the carbon black master batch, which is prepared by adding the entire amount or a portion of carbon black to a solution of the copolymer rubber followed by removal of the solvent.

In addition to process oil and carbon black, the compounding agents used in this invention may include zinc oxide, stearic acid, antioxidants, ozone deterioration retarders, vulcanizing accelerators, vulcanizing agents, wax and the like.

The rubber compositions as described above, which comprise the above-mentioned compounding agents and a rubbery butadiene-styrene random copolymer mixture having a Mooney viscosity from 40 to 150 and a relaxation time from 20 to 200 sec., were found to be of well balanced and excellent physical and processing properties for practical use as tire tread compositions.

DESCRIPTION OF THE PREFERRED EMBODIMENTS

The effects of this invention are illustrated by the following examples but they are to be understood as not limiting the scope of this invention.

EXAMPLE 1

Four reactors, each 15 m.³ in volume and equipped with a jacket, were connected in series with pipes. The reactor 1 was fed continuously with predetermined amounts of butadiene, styrene, hexane and n-butyllithium by means of a metering pump. Into the reactors 2 through 4 respectively were fed predetermined amounts of butadiene and hexane by means of a metering pump. After the reaction in the reactor 4, there were obtained hexane solution of two rubbery random copolymers of butadiene and styrene with a variety of relaxation times, which had the compositions shown in Table 1.

TABLE 1

| Copolymer rubber | A | B |
|---|---|---|
| Content of bound styrene (percent) [1] | 23 | 15 |
| Content of block styrene (percent) [2] | 0.4 | 0.1 |
| Butadiene bond structure: [1] | | |
| Cis-1,4-linkage | 40 | 41 |
| Trans-1,4-linkage | 48 | 47 |
| 1,2-linkage | 12 | 12 |
| Mooney viscosity | 40 | 185 |
| Relaxation time (sec.) [3] | 30 | 300 |

[1] Styrene content and butadiene bond structure were measured using an infrared spectrophotometer and calculated according to the method of Hampton.
[2] To a solution of 2 parts by weight of the butadiene-styrene copolymer in 100 parts by weight of carbon tetrachloride were added 5 parts by weight of tertiarybutyl hydroperoxide and then 0.01 part by weight of osmium tetroxide. The mixture was heated at 80° C. for 15 min. to effect the decomposition. Precipitates formed by adding a large amount of methanol to the resulting solution are the block styrene. The precipitates were separated by filtration, dried in vacuo, weighed and the amount of block styrene calculated as percent by weight in the rubbery butadiene-styrene copolymer.
[3] Relaxation time of the rubber prior to oil extension (measured according to the method described above).

The two hexane solutions prepared above were mixed in such a way that the resulting homogeneous mixture contained the two rubbery copolymers in an equal amount. To the resulting mixture were added one part by weight of 2,6-di-tertiarybutyl-p-cresol per 100 parts by weight of the copolymer mixture and then 37.5 parts by weight of an aromatic process oil with a viscosity-specific gravity ratio of 0.980 per 100 parts by weight of the copolymer mixture. The resulting mixture was stirred and the solvent was removed from the mixture to give an oil extended copolymer rubber mixture shown in Table 2 below.

TABLE 2

| | |
|---|---|
| Content of bound styrene (percent) | 18.5 |
| Mooney viscosity | 42 |
| Relaxation time (sec.): | |
| Oil extended copolymer mixture | 80 |
| Copolymer mixture after the extraction with oil | 60 |

Separately, a hexane solution of a single uniform copolymer rubber with the same Mooney viscosity and relaxation time as of the above-mentioned copolymer mixture was prepared as shown in Table 3.

TABLE 3

| | |
|---|---|
| Content of bound styrene (percent) | 18.2 |
| Mooney viscosity of oil extended polymer | 41.5 |
| Relaxation time (sec.) | 80 |
| Butadiene bond structure: | |
| Cis-1,4-linkage (percent) | 40.5 |
| Trans-1,4-linkage (percent) | 47.5 |
| 1,2-linkage (percent) | 12 |

The same process oil in the same amount as in the case of copolymer rubber mixture was added to the hexane solution of the single uniform copolymer rubber set forth above followed by removal of the solvent.

Then, the copolymer rubber mixture and the single copolymer rubber thus obtained were mixed in the composition shown in Table 4 and extrudability of the resulting mixture was estimated with the results shown in Table 5.

TABLE 4

| | Parts by weight |
|---|---|
| Rubbery butadiene-styrene copolymer | 137.5 |
| Aromatic process oil [1] | 12.5 |
| ISAF grade carbon black | 85 |
| Stearic acid | 2 |
| Zinc oxide | 3 |
| Vulcanizing accelerator NS [2] | 1.6 |
| Sulfur | 1.4 |
| Antioxidant AW [3] | 1 |
| Antioxidant B [4] | 1 |
| Paraffine wax | 2 |

[1] A process oil with a V.G.C. of 0.951 and a specific gravity of 0.9988.
[2] n-Hydroxydiethylene-2-benzothiazylsulfenamide.
[3] 6-ethoxy-2,2,4-trimethyl-1,2-dihydroquinoline.
[4] A reaction product of diphenylamine and acetone at a high temperature.

TABLE 5

| | Copolymer rubber mixture compound | Single uniform copolymer rubber compound |
|---|---|---|
| Rate of extrusion (kg./hr.) | 75 | 72 |
| Extrudate appearance | 5 | 5 |
| State of edge | Good | Good |
| Degree of die swelling | 42 | 60 |

Note.—Extruding conditions: Compounding temperature, 100° C.; rotation of the screw, 50 r.p.m.; screw temperature, 23–24° C. (cooled with water); die temperature, 100° C.

As indicated above, the copolymer rubber mixture exerts a rate of extrusion similar to and a degree of die swelling less than the single uniform mixture.

Next, the compounds thus produced were formed into tire treads followed by vulcanization at 140° C. for 30 min. Capacities for the tire were estimated thereof with the results shown in Table 6.

TABLE 6

| | Copolymer rubber mixture compound | Single uniform copolymer rubber compound |
|---|---|---|
| Temperature by heat generation at the part of tire tread (° C.) | 65 | 70 |
| Abrasion index of the tire [1] | 110 | 100 |
| Slip resistance on the wet road surface: [1] | | |
| Controllability [2] on the road | 98 | 100 |
| Brake applicability [3] | 100 | 100 |
| Pulling capacity [4] | 101 | 100 |

[1] Coefficient of gravity friction of the tire tread rubber was measured using a slip resistance measuring instrument developed by Road Research Laboratory of England on a wet asphalt road surface. The capacity of the tire comprising the single copolymer rubber compound was taken as 100.
[2] Controllability on the road estimated from the maximum speed at which the tire slips while accelerating the car equipped with the tested tire driving on a circle 5 m. in radius, taking that with the SBR-1712 compound as 100.
[3] Brake applicability estimated from the distance from sudden application of brake when driven at a speed of 20 km./hr. to complete standstill of the tire, taking that with the SBR-1712 compound as 100.
[4] Pulling capacity when the tire is rotated at a rate of 800 r.p.m., taking the pulling capacity with the SBR-1712 compound as 100.

As shown in Table 6, it is evident that the copolymer rubber mixture compound is superior in abrasion resistance to the single uniform copolymer rubber compound.

EXAMPLE 2

Four reactors, each of which is 10 liter in volume and equipped with a jacket, were connected in series with pipes. The first reactor was fed with n-hexane, butadiene and styrene respectively at rates of 131.6 g., 21.8 g. and 11.1 g. per minute while introducing n-butyllithium at such a ratio that the n-butyllithium was 0.06 part by weight per 100 parts by weight of the entire monomers. Into the second reactor were fed n-hexane and butadiene respectively at rates of 26.4 g. and 6.6 g. per minute, into the third reactor n-hexane and butadiene respectively at rates of 13.6 g. and 3.4 g. per minute and into the fourth reactor n-hexane and butadiene respectively at rates of 6.8 g. and 1.7 g. per minute. While maintaining the maximum temperature in the reactors at 130° C., solutions of a butadiene-styrene random copolymer were continuously produced. To the solution was added as the stabilizer 2,6-ditert.-butyl-p-cresol, followed by addition of an aromatic process oil at a ratio of 37.5 parts by weight per 100 parts by weight of the polymer. The n-hexane was then removed to give an oil extended polymer. Polymerization conditions and analytical values for the polymer obtained are shown Table 7 (called Polymer 2A).

Next, a random copolymer according to U.S. Pat. 3,294,768 (called reference process hereinbelow) was produced for comparison's sake by the procedures set forth below.

Two reactors, each 10 liters in volume and equipped with a jacket, were connected in series with pipes. Into the first reactor were fed n-hexane, butadiene and styrene respectively at rates of 357.6 g., 67.1 g. and 22.3 g. per minute, while introducing a mixed solution at a 10:1 molar ratio of n-butyllithium and potassium t-butoxide at a rate of 0.07 part by weight of the n-butyllithium per 100 parts by weight of the entire monomers. While maintaining the temperature of the reactors at 50° C., solutions of a butadiene-styrene random copolymer were continuously produced. Additions of the stabilizer and the process oil in the same amounts as above and removal of the n-hexane were followed to give an oil extended polymer. Polymerization conditions and analytical value for the polymer obtained are shown in Table 7 (called Polymer 2B).

A further comparative polymerization was made batchwise to give a random copolymer by the procedures set forth below.

In a 10-liter reactor equipped with a jacket were placed 4.0 kg. of n-hexane, 0.75 kg. of butadiene and 0.25 g. of styrene, followed by addition of a mixed solution at a 10:1 molar ratio of n-butyllithium and potassium t-butoxide at a rate of 0.07 part by weight of the n-butyllithium per 100 parts by weight of the entire monomers. After initiation of the polymerization the temperature was adjusted to 130° C., at which temperature was conducted the polymerization for 2 hours. The resulting polymer was dried in the same way as above. Polymerizaiton conditions and analytical values for the polymer obtained are shown in Table 7 (called Polymer 2C).

TABLE 7

|  | Copolymer A of the present invention | Reference process | |
| --- | --- | --- | --- |
|  |  | Copolymer B | Copolymer C |
| Polymerization process | Continuous | Continuous | Batch |
| Polymerization condition, temp | 130° C.[1] | 50° C.[1] | 130° C.[2] |
| Analysis of the polymer: |  |  |  |
| Bound styrene (percent)[3] | 24.8 | 25.0 | 24.9 |
| Block styrene (percent)[4] | 0.3 | 0 | 0 |
| Butadiene bonding pattern:[3] |  |  |  |
| Cis 1.4 | 40.5 | 38.0 | 37 |
| Trans 1.4 | 48.5 | 51.0 | 51 |
| Vinyl 1,2 | 11.0 | 11.0 | 12 |
| Mooney viscosity[5] | 105 | 101 | 94 |
| Relaxation time[6] | 65 | 4 | 6 |
| Mooney viscosity after the oil extension[5] | 45.0 | 43.0 | 41.0 |

[1] Average residence time 120 min.
[2] Polymerization time 120 min.
[3] Styrene content and butadiene bond structure were measured using an infrared spectrophotometer and calculated according to the method of Hampton.
[4] To a solution of 2 parts by weight of the butadiene-styrene copolymer in 100 parts by weight of carbon tetrachloride were added 5 parts by weight of tertiary-butyl hydroperoxide and then 0.01 part by weight of osmium tetroxide. The mixture was heated at 80° C. for 15 min. to effect the decomposition. Precipitates formed by adding a large amount of methanol to the resulting solution are the block styrene. The precipitates were separated by filtration, dried in vacuo, weighed and the amount of block styrene calculated as percent by weight in the rubbery butadiene-styrene copolymer.
[5] Measured by using Mooney viscometer having a large rotor at 100° C. according to ASTM D-1646-61.
[6] Measured by using Mooney viscometer according to ASTM D-1646 by rotating the rotor for 4 minutes, then putting off the clutch to stop the rotation of the rotor and determining the time (sec.) until reading of the gauge becomes 20% of the Mooney viscosity immediately before release of the clutch.

Then, the two solution polymerized SBR A and B thus prepared were compounded in the proportions indicated in Table 8 by means of a Banbury mixer in accordance with the procedures shown in Table 9. Temperatures were 120° C. at the first step of mixing and 90° C. at the second step of mixing.

TABLE 8

| | Parts by weight |
| --- | --- |
| Oil extended copolymer rubber | 137.5 |
| Aromatic process oil[1] | 12.5 |
| HAF grade carbon black | 85 |
| Stearic acid | 2 |
| Zinc oxide | 5 |
| Antioxidant D[2] | 1.0 |
| Vulcanizing accelerator CZ[3] | 0.9 |
| Sulfur | 1.6 |

[1] Process oil having a specific gravity of 0.9506 and V.G.C. of 0.9605.
[2] Phenyl-β-naphthylamine.
[3] N-cyclohexylbenzothiazylsulfenamide.

TABLE 9

| First step of mixing: | Min. |
| --- | --- |
| Charged with the polymer | 0 |
| Charged with zinc oxide, stearic and antioxidant D | 0.5 |
| Charged with the entire amount of carbon black | 1.0 |
| Charged with process oil | 3.0 |
| Discharged | 6.0 |
| Second step of mixing: | |
| Charged with the mixture from the first step | 0 |
| Charged with accelerator CZ and sulfur | 0.5 |
| Discharged | 3.0 |

Next, the two polymers were examined for mixing properties after the first step of mixing in terms of the dispersing ratio of carbon black, for extrusion processability in terms of the extruding properties using a Garvey Die extruder and for physical properties in terms of physical properties after press vulcanized at 140° C. for 30 minutes. The results are shown in Table 10.

TABLE 10

|  | Copolymer of the present invention (A) | Copolymer of the reference process (B) |
| --- | --- | --- |
| Non-vulcanized product: | | |
| Dispersing ratio of carbon (percent)[1] | 96 | 82 |
| Garvey Die extruding properties:[2] | | |
| Rate of extrusion (kg./hr.) | 68 | 49 |
| Extrudate appearance | 5 | 4 |
| State of edge | Good | Poor |
| Physical properties of vulcanized product: | | |
| Hardness [3] | 62 | 62 |
| 300% tensile modulus (kg./cm.$^2$)[3] | 104 | 100 |
| Tensile strength (kg./cm.$^2$)[3] | 185 | 185 |
| Elongation (percent)[3] | 500 | 500 |
| Impact resilience (20° C.)[4] | 45 | 46 |
| Impact resilience (70° C.)[4] | 58 | 59 |
| Slip resistance on the wet road surface [5] | 100 | 90 |
| Slip resistance on ice surface [5] | 100 | 91 |

[1] Specimen of a compound is compressed, degassed and formed into a small piece about 2.5 × 7 × 5 m./m. The specimen is then immersed in carbon disulfide solution containing 1-3% sulfur chloride at −70° C. for about 10 hrs. followed by standing at room temperature for about 2 hrs. to remove the solvent. The resulting specimen is dried in vacuo for about 10 hrs. to effect cold vulcanization with sulfur chloride. There is given a specimen homogeneous in hardness, which is frozen in liquid nitrogen and cut into slices 2μ in thickness by a microtome. Dispersion of carbon black is examined under an optical microscope in 100 magnifications. In order to express the state of dispersion numerically, the eye lens is provided with a scale of 100 × 100 sections and the scale lines and the lens system is set in such a way that one section corresponds to an area of 13 × 13μ. Thus, the ratio of the sections with a side covered by more than half by carbon black aggregates in a given field of vision of the 100 × 100 sections is estimated and expressed by calculation as the dispersion ratio of carbon black.
[2] Extruding conditions:
Compounding temperature, 100° C.
Rotation of the screw, 50 r.p.m.
Screw temperature, (cooled with water) 23-24° C.
Die temperature, 100° C.
[3] Measured under the conditions of JISK-6301.
[4] Measured using a Dunlop Trypsometer.
[5] Coefficient of gravity friction of the tire tread rubber was measured using a slip resistance measuring instrument developed by Road Research Laboratory of England on the wet asphalt road surface and ice surface.

As indicated by the data in Table 7, Copolymer 2A of the present invention obtained by a continuous polymerization at a temperature as high as 130° C. is a branched polymer with much entanglement and has a longer relaxation time than that of Polymer 2B according to the reference obtained by a continuous polymerization at a temperature as low as 50° C. Furthermore, difference in structure between the copolymer of the present invention and the copolymer obtained by the batch process is apparent in view of the relaxation time of 65 seconds with the former, and 6 seconds with the latter.

The copolymer used in the present invention is different from the copolymer in the reference not only in the preparative process but also in the resulting rubber, particularly in relaxation time.

Next, explanations is made of the data in Table 10 on the fact that the rubber obtained according to the present invention is superior in many respects.

When one considers as the first factor degree of the dispersion of carbon black when compounded in a Banbury mixer, one of the processability of the non-vulcanized rubber, good dispersability of the copolymer according to the present invention is apparent so that a rationalization of the process for compounding fillers in the tire producing step can be advantageously expected.

The results for extrusion processability indicates that the rubber according to the present invention is excellent in every respect in view of the results for rate of extrusion, extrudate appearance and state of edge.

Moreover, physical properties of the vulcanized rubber of the present invention are almost the same with respect to hardness, tensile properties and impact resilience as, but are superior in slip resistances on the wet road surface as well as on ice surface to, those of the reference process.

As described above, the solution polymerized SBR with a long relaxation time is excellent in carbon black dispensability and extrusion processability and comparative or superior in physical properties as compared with the rubber of the reference process (U.S. Pat. 3,294,768). As a matter of fact, the former composition evidently represents improvement in slip resistance on a wet road surface with no deterioration in good properties such as impact resilience of the solution polymerized rubber and also much improvement in processability, which is not satisfactory with known solution polymerized rubbers. Compositions according to the present invention have physical properties superior to known solution polymerized SBR.

What we claim is:

1. Rubber compositions suitable for tire tread with improved processability comprising from 25 to 75 parts by weight of a process oil having a viscosity-specific gravity constant not less than 0.850 and from 40 to 100 parts by weight of carbon black per 100 parts by weight of a rubber component comprising at least 30% by weight of a copolymer mixture having a Mooney viscosity of from 40 to 150 and a relaxation time of from 20 to 200 sec. as measured by a Mooney viscometer and 70% or less of at least one member selected from the group consisting of natural rubber, emulsion polymerized rubbery butadiene-styrene copolymer, emulsion polymerized rubbery polybutadiene, solution polymerized rubbery low-cis and high-cis polybutadiene, rubbery polybutadiene and rubbery butadiene-styrene copolymer polymerized with an alfin catalyst, rubbery polyisoprene and rubbery butadiene-isoprene copolymer, said copolymer mixture comprising from 10 to 90 parts by weight of a rubbery butadiene-styrene random copolymer containing from 5 to 30% by weight of styrene, at least 60% of 1,4-linkage in butadiene units, having a Mooney viscosity of from 5 to 75 and a relaxation time of from 5 to 100 sec., and from 90 to 10 parts by weight of a rubbery butadiene-styrene random copolymer containing from 5 to 30% by weight of styrene, at least 60% of 1,4-linkage in butadiene units, having a Mooney viscosity of from 85 to 250 and a relaxation time of from 60 to 1000 sec., said butadiene-styrene random copolymers being respectively produced in a continuous process by using a catalyst consisting of lithium or an organolithium compound under the polymerization conditions of from 120° to 180° C. with an average residence time of 1-3 hours, said Mooney viscosity being measured at 100° C. at a rotor rate of 2 r.p.m., said relaxation time being the time following normal measurement of the Mooney viscosity for the Mooney viscometer reading to reach a value of 20% of the Mooney viscosity value immediately before stopping of the rotor of said viscometer.

2. Rubber compositions of claim 1, wherein said process oil has a viscosity-specific gravity constant of at least 0.900.

3. Rubber compositions of claim 1, wherein said rubbery butadiene-styrene random copolymers are obtained by a continuous process for polymerizing butadiene and styrene in the presence of said catalyst, wherein a monomer mixture containing excess styrene is charged initially and additional butadiene is continuously or intermittently charged to the reactor system.

References Cited

UNITED STATES PATENTS

| | | | |
|---|---|---|---|
| 3,294,768 | 12/1966 | Wofford | 200—83.7 |
| 3,331,821 | 7/1967 | Strobel | 260—83.7 |
| 2,877,200 | 5/1959 | Carpenter | 260—83.7 |
| 3,596,697 | 8/1971 | Hansley | 260—894 |

FOREIGN PATENTS

| | | | |
|---|---|---|---|
| 1,029,445 | 5/1966 | Great Britain | 260—83.7 |

OTHER REFERENCES

Haws: Rubber and Plastics Age 46, 1144–1145 (1965), TS 1870 R58.

Vanderbilt Rubber Handbook (11th ed.) (R. T. Vanderbilt) (New York) (1968), pp. 54–56, TS 1890 V3.

ALLAN LIEBERMAN, Primary Examiner

H. H. FLETCHER, Assistant Examiner

U.S. Cl. X.R.

260—41.5 R, 83.7, 94.2 M, 894

UNITED STATES PATENT OFFICE
CERTIFICATE OF CORRECTION

Patent No. 3,795,652        Dated March 4, 1974

Inventor(s) KORETAKA YAMAGUCHI et al

It is certified that error appears in the above-identified patent and that said Letters Patent are hereby corrected as shown below:

Column 1, after line 8: insert the following paragraph:

---Claims priority, application Japan,

November 14, 1968, 43/82,877--- .

Signed and sealed this 17th day of September 1974.

(SEAL)
Attest:

McCOY M. GIBSON JR.
Attesting Officer

C. MARSHALL DANN
Commissioner of Patents